United States Patent
Kunimasa

(10) Patent No.: US 9,731,592 B2
(45) Date of Patent: Aug. 15, 2017

(54) VEHICLE FRONT SECTION AIR INTAKE STRUCTURE

(71) Applicant: TOYOTA JIDOSHA KABUSHIKI KAISHA, Toyota-shi (JP)

(72) Inventor: Takayuki Kunimasa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/210,124

(22) Filed: Jul. 14, 2016

(65) Prior Publication Data

US 2017/0057337 A1    Mar. 2, 2017

(30) Foreign Application Priority Data

Aug. 28, 2015 (JP) .................................. 2015-169444

(51) Int. Cl.
| | | |
|---|---|---|
| *B60K 11/00* | (2006.01) | |
| *B60K 11/04* | (2006.01) | |
| *B62D 25/08* | (2006.01) | |

(52) U.S. Cl.
CPC ............ *B60K 11/04* (2013.01); *B62D 25/084* (2013.01)

(58) Field of Classification Search
CPC .................. B60K 11/00–11/08; B62D 25/084
See application file for complete search history.

(56) References Cited

U.S. PATENT DOCUMENTS

| 4,485,882 A | * | 12/1984 | Ide ........................... | B60K 5/04 180/297 |
|---|---|---|---|---|
| 4,598,786 A | * | 7/1986 | Kirchweger ........... | B60K 11/08 180/68.1 |
| 6,302,228 B1 | * | 10/2001 | Cottereau .............. | B60K 11/08 180/68.1 |
| 6,386,624 B1 | * | 5/2002 | Schultz ................ | B62D 25/084 180/68.4 |
| 6,467,538 B1 | * | 10/2002 | Acre ........................ | B60H 1/02 165/266 |
| 6,634,702 B1 | * | 10/2003 | Pleschke ................. | B60R 19/18 293/102 |

(Continued)

FOREIGN PATENT DOCUMENTS

| JP | 6-316224 | 11/1994 |
|---|---|---|
| JP | 2003-72396 | 3/2003 |
| JP | 2005-282488 | 10/2005 |

*Primary Examiner* — Erez Gurari
(74) *Attorney, Agent, or Firm* — Oblon, McClelland, Maier & Neustadt, L.L.P.

(57) ABSTRACT

A vehicle front section air intake structure of a vehicle, equipped with a radiator support, comprises a radiator grille; a hood inner panel; a radiator support cover disposed between an upper end portion of the radiator support and the hood inner panel; and an air intake duct that guides air toward an engine. The radiator support cover includes a cover ventilation section that causes an air current from the radiator grille to flow between the radiator support cover and the hood inner panel, and an air guidance port that guides the air current toward the vehicle rear side. The cover ventilation section is provided with plural upper side bars and plural lower side bars, both extending along a vehicle front-rear direction. The upper side bars are disposed alternating with slits in the vehicle width direction and the lower side bars are disposed at a vehicle lower side of the slits.

8 Claims, 9 Drawing Sheets

(56) References Cited

U.S. PATENT DOCUMENTS

| | | | | |
|---|---|---|---|---|
| 6,880,655 B2* | 4/2005 | Suwa | B60K 13/02 | 180/68.1 |
| 7,013,951 B2* | 3/2006 | Bauer | B60K 11/08 | 165/41 |
| 8,127,878 B2* | 3/2012 | Teraguchi | B60K 11/08 | 180/68.1 |
| 8,128,158 B1* | 3/2012 | Davis | B60K 11/08 | 181/224 |
| 8,491,038 B2* | 7/2013 | Challal | B60R 21/34 | 180/68.4 |
| 8,540,043 B2* | 9/2013 | Mehlos | B60K 13/02 | 180/68.1 |
| 8,645,028 B2* | 2/2014 | Mochizuki | B60K 11/085 | 123/41.05 |
| 8,845,010 B2* | 9/2014 | Townson | G01B 5/24 | 29/897.2 |
| 8,915,320 B2* | 12/2014 | Chinta | B60K 11/085 | 180/68.1 |
| 8,960,343 B2* | 2/2015 | Asano | B60K 11/04 | 180/68.1 |
| 9,132,862 B2* | 9/2015 | Kageyama | E05B 17/2003 | |
| 9,469,187 B1* | 10/2016 | Ho | B60K 11/08 | |
| 2003/0042055 A1 | 3/2003 | Suwa et al. | | |
| 2004/0035551 A1* | 2/2004 | Tamura | B60K 11/04 | 165/41 |
| 2004/0194912 A1* | 10/2004 | Honda | B60H 1/004 | 165/42 |
| 2005/0230162 A1* | 10/2005 | Murayama | B62D 25/084 | 180/68.1 |
| 2010/0326756 A1* | 12/2010 | Landgraf | B60K 13/02 | 180/68.3 |
| 2013/0081888 A1* | 4/2013 | Charnesky | B60K 11/04 | 180/68.3 |
| 2013/0244562 A1* | 9/2013 | Maurer | F01P 11/10 | 454/152 |
| 2015/0252716 A1* | 9/2015 | Tanno | B60K 13/04 | 123/41.58 |
| 2015/0321548 A1* | 11/2015 | Hori | B60K 11/085 | 180/68.1 |
| 2016/0193977 A1* | 7/2016 | Calleja | B60R 19/12 | 293/115 |
| 2016/0368368 A1* | 12/2016 | Bruckner | B60K 11/085 | |
| 2017/0057337 A1* | 3/2017 | Kunimasa | B62D 25/084 | |

\* cited by examiner

VEHICLE FRONT SECTION AIR INTAKE STRUCTURE

CROSS-REFERENCE TO RELATED APPLICATION

This application claims priority under 35 USC 119 from Japanese Patent Application No. 2015-169444 filed Aug. 28, 2015, the disclosure of which is incorporated by reference herein in its entirety.

BACKGROUND

Technical Field

Preferred embodiments relate to a vehicle front section air intake structure.

Related Art

JP-A No. 2003-72396 describes a vehicle front section air intake structure.

Specifically, the vehicle front section air intake structure includes an engine air intake duct disposed at the vehicle upper side of a radiator inside an engine room, and a radiator grille disposed at the vehicle front of the engine air intake duct. An air intake port of the engine air intake duct is disposed facing toward a radiator grille side at a position offset from the vehicle width direction center toward the left. Only a portion of the radiator grille facing to the air intake port of the engine air intake duct is closed off. Namely, airflow passes through locations other than the closed off location of the radiator grille, and enters the engine room. Thus airflow that has passed through the radiator grille enters the air intake port after changing direction toward the air intake port that is offset from the vehicle width direction center toward the left side, without directly entering the air intake port. Foreign matter such as water droplets that are mixed in the airflow is separated therefrom when the direction of the air us changed.

However, in the configuration described in JP-A No. 2003-72396, since the airflow that has passed through the radiator grille changes direction to enter the air intake port, there is a possibility that foreign matter would enter the air intake port together with the airflow, depending on the weight of the foreign matter mixed in the airflow. There is accordingly room for improvement in the above disclosure regarding this point.

SUMMARY

In consideration of the above circumstances, an object of preferred embodiments is to restrict foreign matter from entering an air intake duct.

A vehicle front section air intake structure of a first aspect of the disclosure is for a vehicle that is equipped with a substantially frame shaped radiator support extending along a vehicle width direction, and the vehicle front section air intake structure includes: a radiator grille that is provided at a vehicle front side of the radiator support; a hood inner panel that is disposed at a vehicle upper side of the radiator support and the radiator grille; a radiator support cover that has a front end portion fixed to an upper portion of the radiator grille, that is disposed separated from the hood inner panel between an upper end portion of the radiator support and the hood inner panel, and that is formed in a substantially plate shape extending in the vehicle width direction along the radiator support; and an air intake duct that is provided at a vehicle rear side of the radiator support cover and that guides air from an air guidance port of the radiator support cover toward an engine. The radiator support cover includes a cover ventilation section that causes an air current from the radiator grille to flow between the radiator support cover and the hood inner panel, and the air guidance port that is formed at a vehicle rear of the cover ventilation section and that guides the air current toward the vehicle rear side. The cover ventilation section of the radiator support cover is provided with plural upper side bars that extend along a vehicle front-rear direction and are disposed alternating with slits in the vehicle width direction, and plural lower side bars that are disposed at a vehicle lower side of the slits and that extend along the vehicle front-rear direction.

In the vehicle front section air intake structure of the first aspect, the cover ventilation section is formed at the radiator support cover. The cover ventilation section includes the upper side bars and the lower side bars. The lower side bars are provided at the vehicle lower side of the slits between the respective upper side bars. Namely, the upper side bars and the lower side bars are disposed in alternate positions to each other in the vehicle up-down direction. Thus, airflow flowing from the vehicle front toward the vehicle rear that enters the radiator grille hits the radiator support, changes direction toward the vehicle rear side and vehicle upper side, and flows into the cover ventilation section formed at the radiator support cover fixed to the upper portion of the radiator grille. The airflow that has flowed into the cover ventilation section flows through the slits and above the radiator support cover while slipping through between the lower side bars and the upper side bars, then passes through between the hood inner panel and the radiator support cover, flows toward the vehicle rear side, and is guided through the air guidance port into the air intake duct. In cases in which foreign matter such as water droplets is contained in the airflow, the foreign matter flows into the cover ventilation section together with the airflow; however, foreign matter generally has more inertia than airflow (air). Thus, the foreign matter collides with the lower side bars or the upper side bars without being able to follow the airflow that flows toward the vehicle upper side and slips through between the lower side bars and the upper side bars. The foreign matter is thereby bounced back in the opposite direction to the direction of the airflow, or the flow orientation is changed to run along the lower side bars or the upper side bars. Since the foreign matter has more inertia, the foreign matter attempts to continue to flow in a state in which its orientation is changed. Note that, since air has relatively less inertia, in cases in which air has collided the lower side bars or the upper side bars, even if the flow orientation changes, the air flows from the vehicle lower side toward the vehicle upper side again due to the influence of following airflow, and slips through between the lower side bars and the upper side bars.

The foreign matter that has changed flow orientation collides with the following airflow due to continuing to flow in the changed flow orientation. In cases in which the following airflow contains foreign matter, the foreign matter that has changed flow orientation and the following foreign matter collide with each other, such that the impetus of the flow of the following foreign matter toward the vehicle upper side is reduced. Namely, foreign matter can be restricted from slipping through between the lower side bars and the upper side bars.

A vehicle front section air intake structure of a second aspect of the disclosure includes the first aspect, wherein the lower side bars are disposed in positions overlapping with the slits in a vehicle plan view.

In the second aspect, since the lower side bars are disposed in positions overlapping with the slits in vehicle plan view, foreign matter contained in the airflow that has entered through the radiator grille collides with the lower side bars and the upper side bars more readily. This enables the foreign matter to be further restricted from slipping through between the lower side bars and the upper side bars.

A vehicle front section air intake structure of a third aspect of the disclosure includes the first aspect or the second aspect, wherein a first direction-changing face formed so as to be recessed inward toward the vehicle upper side is formed at a vehicle lower side portion of at least one of either the upper side bars or the lower side bars.

In the third aspect, the first direction-changing face formed so as to be recessed inward toward the vehicle upper side is formed at the vehicle lower side portion of at least one of either the upper side bars or the lower side bars. Thus, airflow that has entered through the radiator grille passes through the slits and flows toward the vehicle upper side, and when foreign matter contained in the airflow collides with the first direction-changing face, the flow orientation of the foreign matter changes toward the vehicle lower side along the first direction-changing face. The foreign matter flowing toward the vehicle lower side collides with other foreign matter contained in the following airflow, thereby enabling the impetus of the flow of the other foreign matter toward the vehicle upper side to be reduced. Namely, foreign matter can be further restricted from slipping through between the lower side bars and the upper side bars.

A vehicle front section air intake structure of a fourth aspect of the disclosure includes the first aspect or the second aspect, wherein a second direction-changing face is formed at a vehicle lower side portion of at least one of either the upper side bars or the lower side bars. The second direction-changing face includes sloped faces that slope toward the vehicle upper side from an apex formed at a substantially vehicle width direction center portion of the vehicle lower side portion of at least one of either the upper side bars or the lower side bars. The sloped faces are disposed progressing along the vehicle width direction and away from each other.

In the fourth aspect, airflow that has entered through the radiator grille passes through the slits and flows toward the vehicle upper side, and when foreign matter contained in the airflow collides with the second direction changing faces, the foreign matter is bounced back diagonally toward the vehicle lower side. The foreign matter that has bounced back collides with other foreign matter contained in the following airflow, thereby enabling the impetus of the flow of the other foreign matter toward the vehicle upper side to be reduced. Namely, foreign matter can be further restricted from slipping through between the lower side bars and the upper side bars.

A vehicle front section air intake structure of a fifth aspect of the disclosure includes any one of the first aspect to the fourth aspect, wherein at least a portion of the cover ventilation section is disposed in a position overlapping with the air guidance port when viewing the vehicle face-on.

In the fifth aspect, the cover ventilation section is disposed in a position overlapping with the air guidance port when viewing the vehicle face-on. Thus, airflow that has entered the radiator grille from the vehicle front flows above the cover ventilation section, then passes between the hood inner panel and the radiator support cover, flows toward the vehicle rear side, and flows through the air guidance port into the air intake duct. Namely, there is no need to change the flow along the vehicle width direction when the airflow flows from the cover ventilation section toward the air guidance port. This enables the airflow to be efficiently guided toward the air intake duct.

A vehicle front section air intake structure of a sixth aspect of the disclosure includes the fifth aspect, wherein the air guidance port is open toward the vehicle front.

In the sixth aspect, airflow that has entered the radiator grille from the vehicle front flows above the cover ventilation section, then passes between the hood inner panel and the radiator support cover, and flows toward the vehicle rear side. Since the air guidance port is open toward the vehicle front, the airflow flowing toward the vehicle rear side can be efficiently guided into the air intake duct.

A vehicle front section air intake structure of a seventh aspect of the disclosure includes any one of the first aspect to the sixth aspect, wherein the radiator support cover is abutted by the hood inner panel with a sealing member interposed therebetween along the vehicle width direction at further toward the vehicle rear side than a position at which the air guidance port is formed.

In the seventh aspect, the radiator support cover is abutted by the hood inner panel with the scaling member interposed therebetween at further toward the vehicle rear side than a position at which the air guidance port is formed. This enables airflow that has passed through the cover ventilation section to be prevented from flowing out from between the radiator support cover and the hood inner panel. This enables the airflow to be efficiently guided from the air guidance port into the air intake duct.

A vehicle front section air intake structure of an eighth aspect of the disclosure includes any one of the first aspect to the seventh aspect, wherein a vehicle lower side face of the air guidance port is disposed further toward the vehicle upper side than vehicle upper side faces of the upper side bars.

In the eighth aspect, the vehicle lower side face of the air guidance port is disposed further toward the vehicle upper side than the vehicle upper side faces of the upper side bars. Thus if, by any chance, foreign matter mixed in with the airflow has slipped through between the lower side bars and the upper side bars and has passed through the cover ventilation section, the foreign matter can be restricted from being quickly guided through the air guidance port into the air intake duct, and the foreign matter can be made to fall toward the vehicle lower side under gravity prior to entering the air guidance port. Namely, foreign matter can be restricted from being guided through the air guidance port into the air intake duct.

The vehicle front section air intake structure of the first aspect has an excellent advantageous effect of enabling foreign matter to be restricted from entering the air intake duct.

The vehicle front section air intake structure of the second aspect has an excellent advantageous effect of enabling foreign matter to be further restricted from entering the air intake duct.

The vehicle front section air intake structure of the third aspect has an excellent advantageous effect of enabling foreign matter to be still further restricted from entering the air intake duct.

The vehicle front section air intake structure of the fourth aspect has an excellent advantageous effect of enabling foreign matter to be further restricted from entering the air intake duct.

The vehicle front section air intake structures of the fifth aspect to the seventh aspect have an excellent advantageous effect of enabling airflow to be effectively guided into the air intake duct.

The vehicle front section air intake structure of the eighth aspect has an excellent advantageous effect of enabling foreign matter to be further restricted from entering the air intake duct.

DETAILED DESCRIPTION

First Exemplary Embodiment

Figure 1:
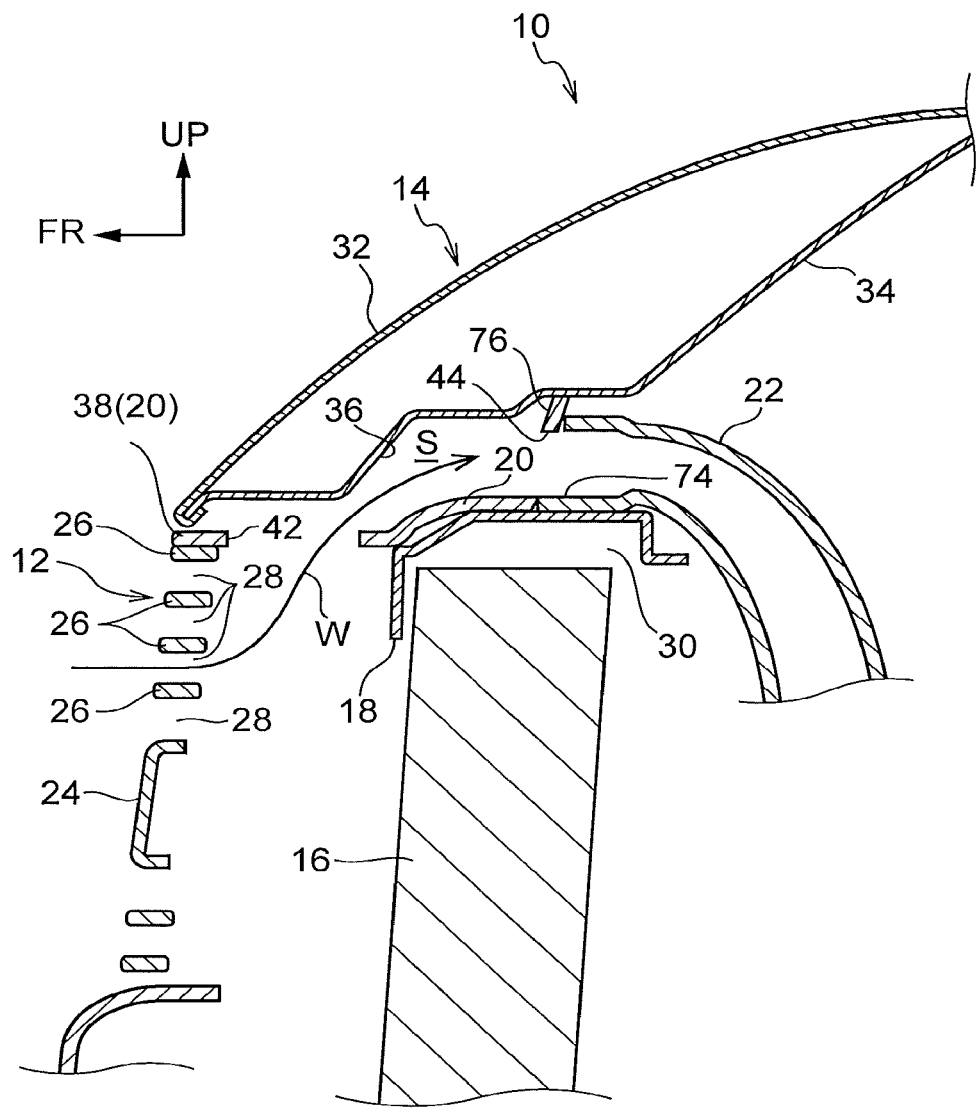
FIG. 1 is an outline cross-section illustrating a vehicle front section air intake structure according to a first exemplary embodiment in a state sectioned along the vehicle up-down direction.

Explanation follows regarding an exemplary embodiment of a vehicle front section air intake structure according to the present invention, with reference to FIGS. 1 to 5. Note that in the drawings, the arrow FR indicates the vehicle front-rear direction front side, the arrow OUT indicates the vehicle width direction outside, and the arrow UP indicates the vehicle up-down direction upper side.

As illustrated in FIG. 1, a vehicle front section of a vehicle 10 is produced including a radiator grille 12, a bonnet hood (engine hood) 14, a radiator 16, a radiator support 18, a radiator support cover 20, and air intake ducts 22.

The radiator grille 12 is disposed between a front bumper 24 and the bonnet hood 14, described later. The radiator grille 12 is provided with plural grille fins 26 extending along the vehicle width direction with a separation in substantially the vehicle up-down direction therebetween. Ventilation ports 28 are accordingly formed passing through in the vehicle front-rear direction between the respective grille fins 26. A ventilation port 28 is also provided between the radiator grille 12 and the front bumper 24.

The radiator support 18 is disposed at the vehicle rear side of the radiator grille 12, and is formed in a substantially frame shape so as to surround the radiator 16. A vehicle upper side portion of the radiator support 18 extends along the vehicle width direction. In cross-section profile of an upper portion of the radiator support 18 in the vehicle front-rear direction, an opening 30 is formed in a substantially U-shape toward the vehicle lower side, and the radiator 16 is housed inside the opening 30.

The bonnet hood 14 is provided at the vehicle upper side of the radiator grille 12 and the radiator support 18. The bonnet hood 14 is formed including a hood outer panel 32 that is disposed at the vehicle outside and forms a styling face of the bonnet hood 14, and a hood inner panel 34 that is disposed at the vehicle inside and reinforces the hood outer panel 32. The hood inner panel 34 is formed with a step portion 36 that is separated in the vehicle up-down direction from the radiator support cover 20, described below.

Figure 2:
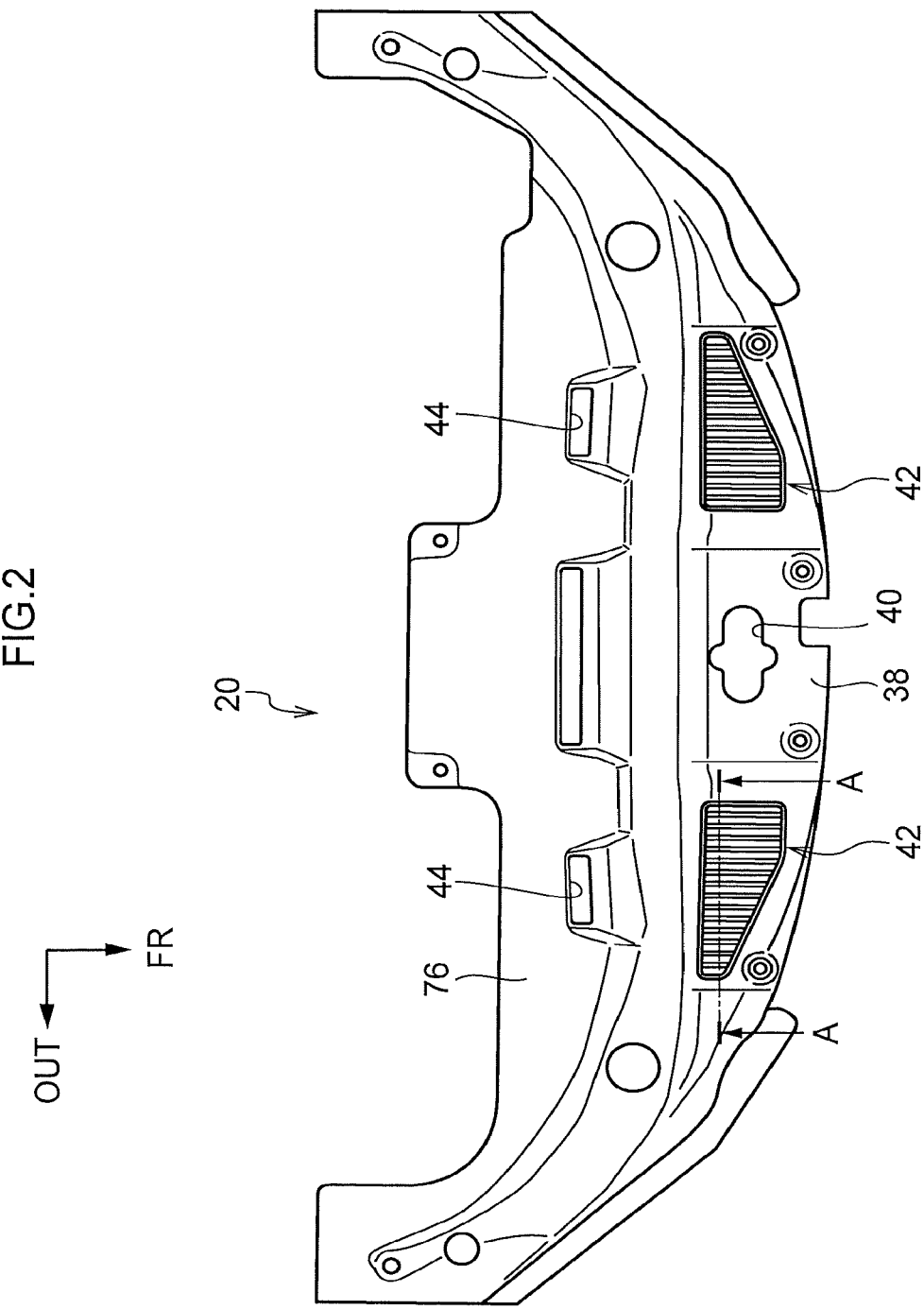
FIG. 2 is a vehicle plan view illustrating a radiator support cover of a vehicle front section air intake structure according to the first exemplary embodiment.

The radiator support cover 20 is disposed at the vehicle upper side of the radiator grille 12 and the radiator support 18, and at the vehicle lower side of the hood inner panel 34. The radiator support cover 20 is disposed separated from the hood inner panel 34 and is formed in a plate shape made of resin with its plate thickness direction along substantially the vehicle up-down direction. As illustrated in FIG. 2, the radiator support cover 20 is formed in a substantially rectangular shape with its length direction along the vehicle width direction in plan view.

Figure 4:
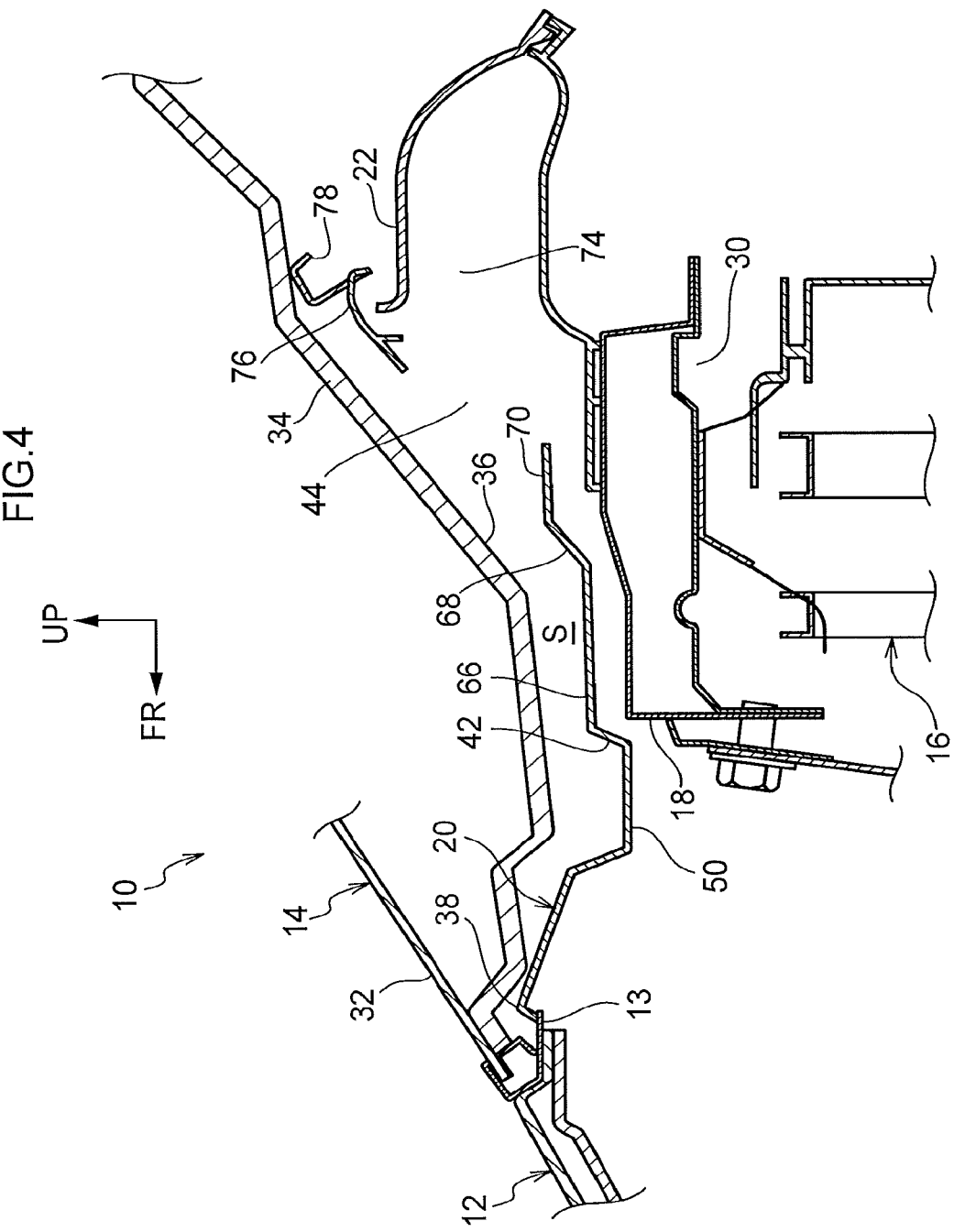
FIG. 4 is an enlarged cross-section illustrating relevant portions of a vehicle front section air intake structure according to the first exemplary embodiment in a state sectioned along the vehicle up-down direction.

A front end portion 38 of the radiator support cover 20 is fixed by a fastening means, not illustrated in the drawings, to a vehicle upper side portion of the radiator grille 12 with a sealing member 13 interposed therebetween (see FIGS. 1 and 4). A striker opening 40, through which a striker, not illustrated in the drawings, for locking the bonnet hood 14 to the vehicle body is formed piercing through in the plate thickness direction at a substantially vehicle width direction center portion of the front end portion 38 of the radiator support cover 20.

The front end portion 38 of the radiator support cover 20 is formed with cover ventilation sections 42 that are each formed in a substantially rectangular shape in vehicle plan view. Two of the cover ventilation sections 42 are formed, and are respectively disposed at the vehicle width direction outsides of the striker opening 40. The cover ventilation sections 42 are disposed in positions that overlap respective air guidance ports 44, described later, when viewing the vehicle face-on.

Figure 3:
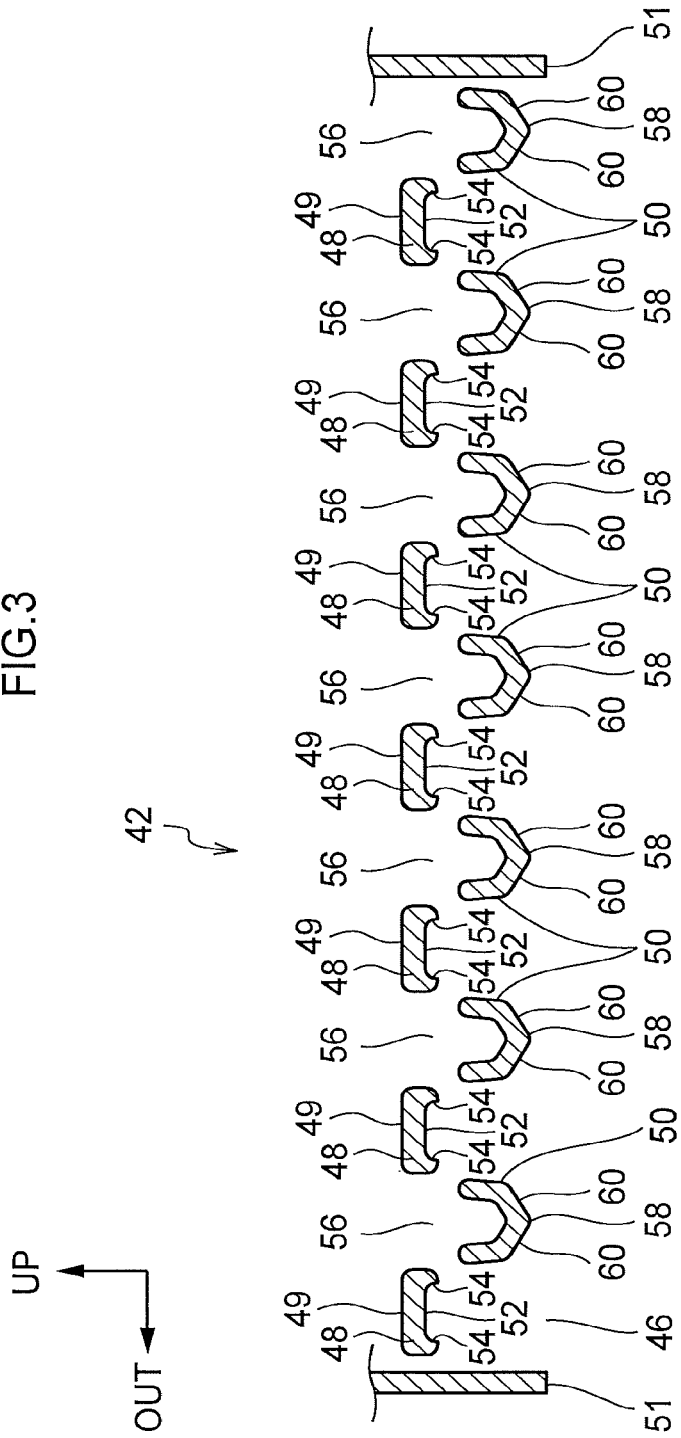
FIG. 3 is an enlarged cross-section illustrating a state sectioned along line A-A in FIG. 2.

As illustrated in FIG. 3, each cover ventilation section 42 is configured including a through-portion 46, upper side bars 48, and lower side bars 50. The through-portion 46 is formed piercing through the plate thickness direction of the radiator support cover 20.

Each upper side bar 48 has its length direction along the vehicle front-rear direction in vehicle plan view, is formed in a rectangular plate shape with its plate thickness direction along the vehicle up-down direction, and is provided between one end portion and another end portion of the through-portion 46 in the vehicle front-rear direction. In other words, each upper side bar 48 is provided so as to span across the through-portion 46 in the vehicle front-rear direction. A first direction-changing face 52 is formed at a vehicle lower side portion of the upper side bar 48. The first direction-changing face 52 formed so as to be recessed inward toward the vehicle upper side in the upper side bar 48. Return portions 54 are thereby formed projecting out toward substantially the vehicle lower side at the respective short direction outsides of the upper side bar 48.

Plural of the upper side bars 48 are provided separated from each other in the width direction of the upper side bars 48. Slits 56 are thereby provided between the adjacent upper side bars 48. Note that a slit 56 is also provided between the upper side bar 48 disposed in close proximity to an outside end portion in a length direction of the cover ventilation section 42 and a boundary wall portion 51 of the cover ventilation section 42.

The lower side bars 50 are provided at the vehicle lower side of the respective slits 56. Each lower side bar 50 is formed in a rectangular shape with its length direction in the vehicle front-rear direction running along the respective slit 56 in vehicle plan view, and is provided in a position corresponding to the slit 56 in the vehicle width direction. Namely, when viewed from the vehicle lower side toward the vehicle upper side, the slit 56 is disposed in a position that is substantially blocked off by the lower side bar 50. In other words, the lower side bars 50 are provided such that air flowing from the vehicle lower side toward the vehicle upper side is less liable to directly flow through the slits 56. Each lower side bar 50 has a cross-section profile along the vehicle width direction formed in substantially a U-shape open toward the vehicle upper side.

A second direction-changing face 58 is formed at a vehicle lower side portion of each lower side bar 50. The second direction-changing face 58 is configured by sloped faces 60 that slope toward the vehicle upper side from an apex formed at a substantially vehicle width direction center portion of the lower side bar 50. The sloped faces 60 are disposed progressing along the vehicle width direction and away from each other. A corner portion is formed by the sloped faces 60 abutting each other at the substantially vehicle width direction center portion of the lower side bar 50; however, configuration is not limited to the corner portion, and a curved face may be formed instead.

The upper side bars 48 and the lower side bars 50 are integrally formed to the radiator support cover 20. To allow molding using a mold, a lateral direction dimension of each lower side bar 50 is set shorter than a vehicle width direction dimension of each slit 56 to allow mold removal. Gaps are thereby formed between lateral direction end portions of each of the lower side bars 50 and vehicle width direction end portions of each of the slits 56 when viewed in the mold removal direction.

As illustrated in FIG. 2, the air guidance ports 44 are formed at the radiator support cover 20 at the vehicle rear side of the cover ventilation sections 42. As illustrated in FIG. 4, the air guidance ports 44 are formed to a raised wall portion 68 that slopes toward the vehicle upper side on progression toward the vehicle rear side with respect to a planar portion 66 formed with the cover ventilation sections 42. The air guidance ports 44 are formed to provide openings along the vehicle front-rear direction, and so are open toward the vehicle front. Note that a vehicle lower side face 70 of the air guidance ports 44 is disposed further toward the vehicle upper side than the planar portion 66 and the vehicle upper side faces 49 of the upper side bars 48. The vehicle upper side faces 49 of the upper side bars 48 are disposed at the vehicle lower side with respect to the planar portion 66.

The air intake ducts 22 are provided at the vehicle rear of the respective air guidance ports 44. Each air intake duct 22 has a hollow interior, and is formed with an air intake port 74 at the vehicle front side. A discharge port connected to an air cleaner (neither of which are illustrated in the drawings) is formed at the vehicle rear side of the air intake duct 22. The air guidance ports 44 are formed at positions corresponding to the respective air intake ports 74, such that air that has entered through the air guidance ports 44 is guided into the air intake ducts 22, flows through the air intake ports 74 and into the air cleaner, and is supplied to an engine, not illustrated in the drawings.

A sealing member 78 abuts a vehicle rear side portion 76 of the radiator support cover 20. The sealing member 78 is made of a flexible material, and is disposed substantially along the vehicle width direction. The sealing member 78 is attached to the hood inner panel 34, and is configured so as to undergo deformation on abutting the vehicle rear side portion 76 of the radiator support cover 20 in a closed state of the bonnet hood 14. A vehicle rear portion of the radiator support cover 20 thereby abuts the hood inner panel 34 with the sealing member 78 interposed therebetween. The vehicle width direction outsides of the radiator support cover 20 also abut the hood inner panel 34 through sealing members, not illustrated in the drawings. Air is thereby prevented from leaking out to the exterior from a space S between the radiator support cover 20 and the hood inner panel 34.

Operation and Advantageous Effects of First Exemplary Embodiment

Explanation follows operation and advantageous effects of the present exemplary embodiment.

Figure 5:
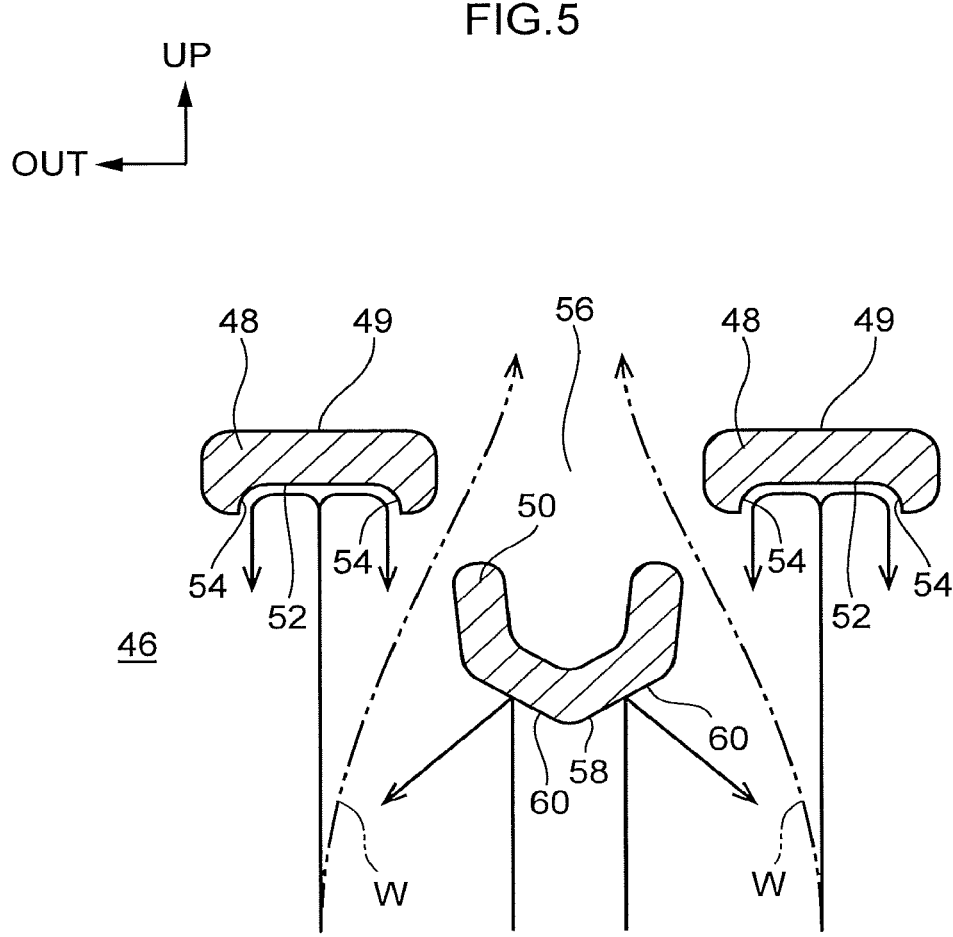
FIG. 5 is an outline cross-section schematically illustrating a flow of air in a cover ventilation section of a vehicle front section according to the first exemplary embodiment.

As illustrated in FIG. 2, in the present exemplary embodiment, the cover ventilation sections 42 are formed at the radiator support cover 20. Each cover ventilation section 42 includes the upper side bars 48 and the lower side bars 50. The lower side bars 50 are provided at the vehicle lower side of the slits 56 formed between the respective upper side bars 48. Namely, the upper side bars 48 and the lower side bars 50 are disposed in different positions to each other in the vehicle up-down direction. Thus, as illustrated in FIG. 1, airflow W flowing from the vehicle front side toward the vehicle rear side that enters the radiator grille 12 hits the radiator support 18, changes direction toward the vehicle rear and vehicle upper side, and flows into the cover ventilation sections 42 formed at the radiator support cover 20 fixed to an upper portion of the radiator grille 12. The airflow W that has flowed into the cover ventilation sections 42 flows through the slits 56 and above the radiator support cover 20 while slipping through between the lower side bars 50 and the upper side bars 48, then passes through between the hood inner panel 34 and the radiator support cover 20, flows toward the vehicle rear side, and is guided through the air guidance ports 44 into the air intake ducts 22. In cases in which foreign matter such as water droplets is contained in the airflow W, this foreign matter flows into the cover ventilation sections 42 together with the airflow W; however, foreign matter is generally has more inertia than airflow W (air). Thus, as illustrated in FIG. 5, the foreign matter (the solid lines in FIG. 5) collides with the lower side bars 50 or the upper side bars 48 without being able to follow the airflow W (the double-dotted dashed lines in FIG. 5) that flows toward the vehicle upper side and slips through between the lower side bars 50 and the upper side bars 48. Specifically, when foreign matter collides with the second direction-changing faces 58 of the lower side bars 50, the foreign matter bounces back diagonally toward the vehicle lower side. When foreign matter collides with the first direction-changing faces 52 of the upper side bars 48, the flow orientation of the foreign matter is changed toward substantially the vehicle lower side along the return portions 54 of the first direction-changing faces 52. The foreign matter is thereby bounced back in the opposite direction (diagonally toward the vehicle lower side) to the flow direction of the airflow W (air), or the flow orientation is changed to the vehicle lower side. Since the foreign matter has more inertia, the foreign matter attempts to continue to flow in a state in which its orientation is changed. Note that, since air has relatively less inertia, in cases in which air collides the lower side bars 50 or the upper side bars 48, even if the flow orientation changes, the air flows from the vehicle lower side toward the vehicle upper side again due to the influence of following airflow W, and slips through between the lower side bars 50 and the upper side bars 48.

The foreign matter that has changed flow orientation collides with the following airflow W due to continuing to flow in the changed orientation substantially downward. In cases in which the following airflow W contains foreign matter, the foreign matter that has changed flow orientation and the following foreign matter collide with each other, such that the impetus of the flow of the following foreign matter toward the vehicle upper side is reduced. Namely, foreign matter is restricted from slipping through between the lower side bars 50 and the upper side bars 48. This enables foreign matter to be prevented from entering the air intake ducts 22.

Since the lower side bars 50 are disposed in positions overlapping with the respective slits 56 in vehicle plan view, foreign matter contained in the airflow W that has entered through the radiator grille 12 collides with the lower side bars 50 and the upper side bars 48 more readily. This enables the foreign matter to be further restricted from slipping through between the lower side bars 50 and the upper side bars 48. This enables foreign matter to be further restricted from entering the air intake ducts 22.

As illustrated in FIG. 2, the cover ventilation sections 42 are disposed in positions overlapping with the respective air guidance ports 44 when viewing the vehicle face-on. Thus, airflow W that has entered the radiator grille 12 from the vehicle front flows toward the vehicle upper side of the cover ventilation sections 42, then passes between the hood inner panel 34 and the radiator support cover 20, flows toward the vehicle rear side, and flows through the air guidance ports 44 into the air intake ducts 22. Namely, there is no need to change the flow along the vehicle width direction when the airflow W flows from the cover ventilation sections 42 toward the air guidance ports 44. This enables the airflow W to be efficiently guided into the air intake ducts 22.

Airflow W that has entered the radiator grille 12 from the vehicle front flows above the cover ventilation sections 42, then passes between the hood inner panel 34 and the radiator support cover 20, and flows toward the vehicle rear side. Since the air guidance ports 44 are open toward the vehicle front, airflow W flowing toward the vehicle rear can be efficiently guided into the air intake ducts 22.

As illustrated in FIG. 4, the radiator support cover 20 is abutted by the hood inner panel 34 with the sealing member 78 interposed therebetween further toward the vehicle rear side than the positions where the air guidance ports 44 are formed. This enables the airflow W that has flowed through the cover ventilation sections 42 to be prevented from flowing out between the radiator support cover 20 and the hood inner panel 34. This enables the airflow W to be efficiently guided through the air guidance ports 44 into the air intake ducts 22. This enables the airflow W to be effectively guided into the air intake ducts 22.

The vehicle lower side faces 70 of the respective air guidance ports 44 are disposed further toward the vehicle upper side than the vehicle upper side faces 49 of the respective upper side bars 48. Thus if, by any chance, foreign matter mixed in with the airflow W has slipped through between the lower side bars 50 and the upper side bars 48 and has passed through the cover ventilation sections 42, the foreign matter can be restricted from being quickly guided through the air guidance ports 44 into the air intake ducts 22. This enables the foreign matter to be made to fall toward the vehicle lower side under gravity prior to entering the air guidance ports 44. Namely, foreign matter can be restricted from being guided through the air guidance ports 44 into the air intake ducts 22. This enables foreign matter to be still further restricted from entering the air intake ducts 22.

Since the gaps are formed between the upper side bars 48 and the lower side bars 50 as viewed from the mold removal direction, undercut portions do not occur when the upper side bars 48 and the lower side bars 50 are molded in a mold at the same time. Namely, the upper side bars 48 and the lower side bars 50 can be integrally molded when molding the cover ventilation sections 42, and thereby the radiator support cover 20. This enables manufacturing costs to be reduced.

Second Exemplary Embodiment

Figure 6:
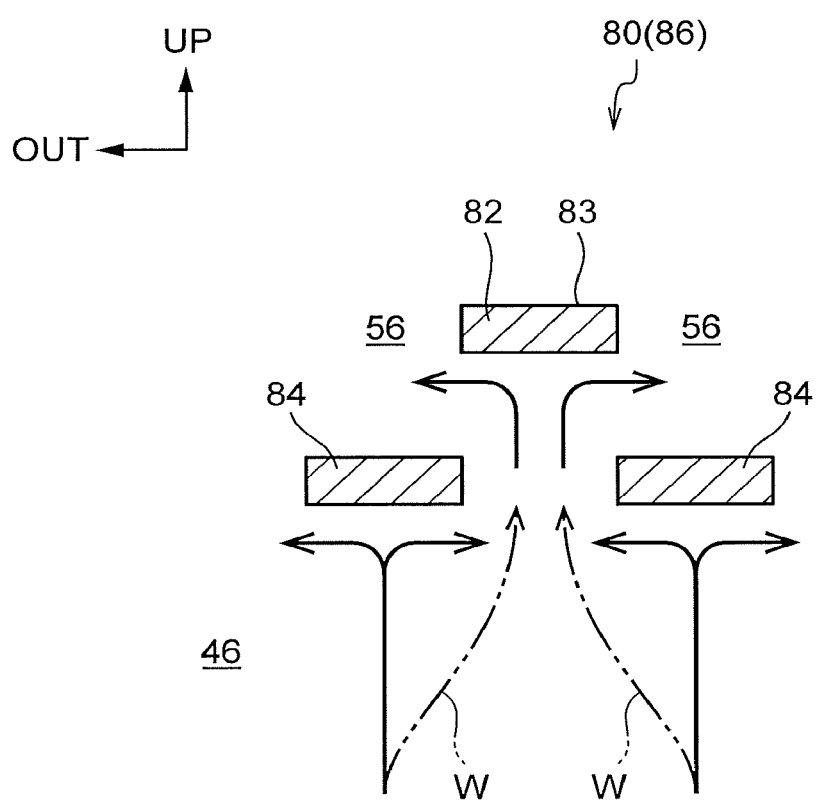
FIG. 6 is an outline cross-section schematically illustrating a flow of air in a cover ventilation section of a vehicle front section according to a second exemplary embodiment.

Explanation follows regarding a vehicle front section air intake structure according to a second exemplary embodiment of the present invention, with reference to FIG. 6. Note that similar configuration portions to the above-described first exemplary embodiment are appended with the same reference numerals, and explanation thereof is omitted.

As illustrated in FIG. 6, the vehicle front section air intake structure according to the second exemplary embodiment has basically the same configuration as that in the first exemplary embodiment, with a feature that the first direction-changing faces 52 and the second direction-changing faces 58 illustrated in FIG. 5 are not formed to upper side bars 82 or lower side bars 84 of cover ventilation sections 80.

Namely, the cover ventilation sections 80 are provided at a radiator support cover 86. The cover ventilation sections 80 are disposed in positions overlapping with the respective air guidance ports 44 when viewing the vehicle face-on (see FIG. 2), and are each configured including the through-portion 46, the upper side bars 82, and the lower side bars 84.

Each upper side bar 82 has its length direction along the vehicle front-rear direction in vehicle plan view, is formed in a rectangular plate shape with its plate thickness direction along the vehicle up-down direction, and is provided between the one end portion and the other end portion of the through-portion 46 in the vehicle front-rear direction. In other words, each upper side bar 82 is provided so as to span across the through-portion 46 in the vehicle front-rear direction. A cross-section profile of the upper side bar 82 along the vehicle width direction forms a rectangular shape with its short side along the vehicle up-down direction. Note that, although not illustrated in the drawings, plural of the upper side bars 82 are provided separated from each other along the width direction of the upper side bars 82. The slits 56 are thereby formed between the adjacent upper side bars 82.

The lower side bars 84 are provided at the vehicle lower side of the slits 56. Each lower side bar 84 is formed in a rectangular plate shape with its length direction running along the respective slit 56 in the vehicle front-rear direction in vehicle plan view. Similarly to the upper side bars 82, a cross-section profile of the lower side bar 84 along the vehicle width direction forms a rectangular shape with its short side along the vehicle up-down direction.

Operation and Advantageous Effects of Second Exemplary Embodiment

Explanation follows operation and advantageous effects of the present exemplary embodiment.

The radiator support cover 86 is similarly formed to the radiator support cover 20 of the first exemplary embodiment, with the exception that the first direction-changing faces 52 and the second direction-changing faces 58 are not formed, and so the above configuration obtains the below advantageous effects, similarly to those in the first exemplary embodiment. Namely, the upper side bars 82 and the lower side bars 84 are disposed in alternate positions to each other in the vehicle up-down direction, thereby restricting foreign matter from slipping through between the lower side bars 84 and the upper side bars 82. Specifically, as illustrated in FIG. 6, the foreign matter (the solid lines in FIG. 6) collides with the lower side bars 84 or the upper side bars 82 without being able to follow the airflow W (the double-dotted dashed lines in FIG. 6) that attempts to flow toward the vehicle upper side and slip through between the lower side bars 84 and the upper side bars 82. The flow orientation of the foreign matter is thereby changed toward substantially the vehicle width direction along vehicle lower side faces of the upper side bars 82 or the lower side bars 84. Since the foreign matter has more inertia, the foreign matter attempts to continue to flow in a state in which its orientation has changed. The foreign matter that has changed flow orientation collides with following airflow W due to continuing to flow in the changed flow orientation. In cases in which the following airflow W contains foreign matter, the foreign matter that has changed flow orientation and the following foreign matter collide with each other, and the following foreign matter is also restricted from flowing upwardly, such that the impetus of the flow toward the vehicle upper side is reduced. Namely, foreign matter is restricted from slipping through between the lower side bars 84 and the upper side bars 82. This enables foreign matter to be restricted from entering the air intake ducts 22.

Since the lower side bars 84 are disposed in positions overlapping with the respective slits 56 in vehicle plan view, foreign matter contained in the airflow W that has entered through the radiator grille 12 collides with the lower side bars 84 and the upper side bars 82 more readily. This enables the foreign matter to be further restricted from slipping through between the lower side bars 84 and the upper side bars 82. This enables foreign matter to be further restricted from entering the air intake ducts 22.

Since the cover ventilation sections 80 are disposed in positions overlapping with the respective air guidance ports 44 in the vehicle width direction (see FIG. 2), there is no need to change the flow along the vehicle width direction when the airflow W flows from the cover ventilation sections 80 toward the air guidance ports 44. This enables the airflow W to be efficiently guided into the air intake ducts 22.

Since the air guidance ports 44 are open toward the vehicle front, airflow W flowing toward the vehicle rear side can be efficiently guided into the air intake ducts 22.

The radiator support cover 86 is abutted by the hood inner panel 34 with the sealing member 78 interposed therebetween further toward the vehicle rear side than the positions where the air guidance ports 44 are formed (see FIG. 4), thereby enabling the airflow W to be efficiently guided through the air guidance ports 44 into the air intake ducts 22. This enables the airflow W to be effectively guided into the air intake ducts 22.

The vehicle lower side faces 70 of the respective air guidance ports 44 are disposed further toward the vehicle upper side than vehicle upper side faces 83 of the respective upper side bars 82, thereby enabling foreign matter to be restricted from being guided through the air guidance ports 44 into the air intake ducts 22. This enables foreign matter to be still further restricted from entering the air intake ducts 22.

Gaps are formed between the upper side bars 82 and the lower side bars 84 as viewed from the mold removal direction, thereby enabling the upper side bars 82 and the lower side bars 84 to be integrally molded when molding the cover ventilation sections 80, and thereby the radiator support cover 86. This enables manufacturing costs to be reduced.

Third Exemplary Embodiment

Figure 7:
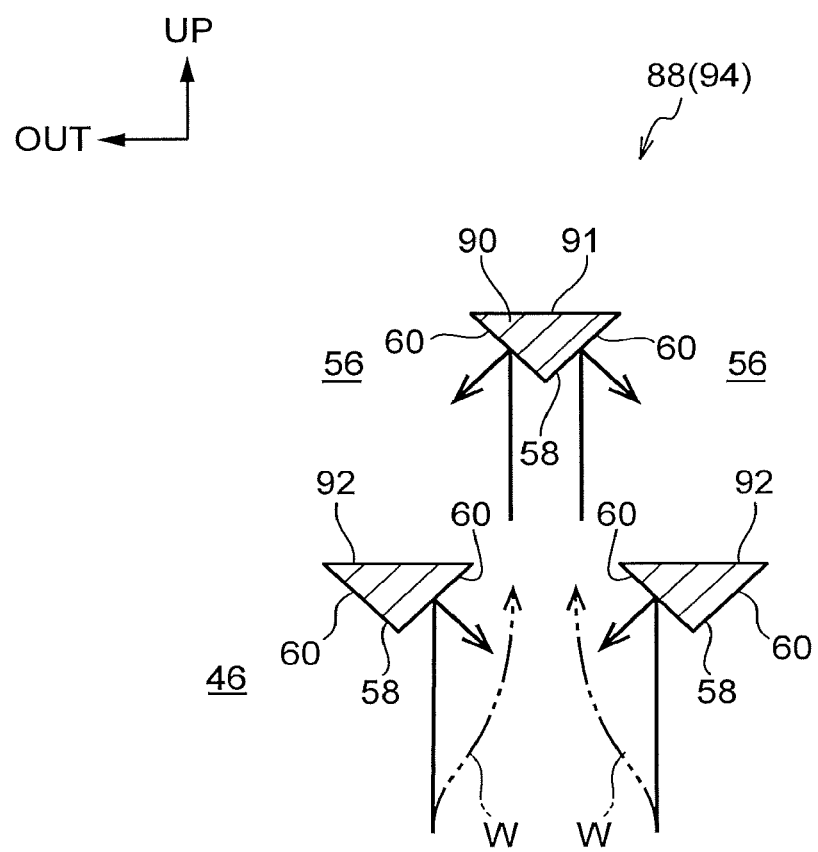
FIG. 7 is an outline cross-section schematically illustrating a flow of air in a cover ventilation section of a vehicle front section according to a third exemplary embodiment.

Explanation follows regarding a vehicle front section air intake structure according to a third exemplary embodiment of the present invention, with reference to FIG. 7. Note that similar configuration portions to the above-described first exemplary embodiment are appended with the same reference numerals, and explanation thereof is omitted.

As illustrated in FIG. 7, the vehicle front section air intake structure according to the third exemplary embodiment has basically the same configuration as that in the first exemplary embodiment, with a feature that the second direction-changing faces 58 are formed to both upper side bars 90 and lower side bars 92 of cover ventilation sections 88.

Namely, the cover ventilation sections 88 are provided at a radiator support cover 94. The cover ventilation sections 88 are disposed in positions overlapping with the respective air guidance ports 44 when viewing the vehicle face-on, and are each includes the through-portion 46, the upper side bars 90, and the lower side bars 92.

Each upper side bar 90 is formed in a rectangular shape with its length direction along the vehicle front-rear direction in vehicle plan view. In other words, each upper side bar 90 is provided so as to span across the through-portion 46 in the vehicle front-rear direction. The second direction-changing face 58 is formed to a vehicle lower side portion of each upper side bar 90. A cross-section profile along the vehicle width direction of each upper side bar 90 is accordingly formed in an inverted triangular shape with a vehicle upper side face 91 as a bottom face. Note that, although not illustrated in the drawings, plural of the upper side bars 90 are provided separated from each other along the width direction of the upper side bars 90. The slits 56 are thereby formed between the adjacent upper side bars 90.

The lower side bars 92 are provided at the vehicle lower side of the slits 56. Each lower side bar 92 is formed in a rectangular shape with its length direction running along the respective slit 56 in the vehicle front-rear direction in vehicle plan view. Similarly to the upper side bars 90, the second direction-changing face 58 is formed to a vehicle lower side portion of each lower side bar 92. A cross-section profile along the vehicle width direction of each lower side bar 92 is accordingly formed in an inverted triangular shape with a vehicle upper side face as a bottom face.

Operation and Advantageous Effects of Third Exemplary Embodiment

Explanation follows operation and advantageous effects of the present exemplary embodiment.

The radiator support cover 94 is similarly formed to the radiator support cover 20 of the first exemplary embodiment with the exception that the second direction-changing faces 58 are formed to both the upper side bars 90 and the lower side bars 92, and so the above configuration obtains the below advantageous effects, similarly to those in the first exemplary embodiment. Namely, the upper side bars 90 and the lower side bars 92 are disposed in alternate positions to each other in the vehicle up-down direction, thereby restricting foreign matter from slipping through between the lower side bars 92 and the upper side bars 90. This enables foreign matter to be restricted from entering the air intake ducts 22.

Since the lower side bars 92 are disposed in positions overlapping with the respective slits 56 in vehicle plan view, foreign matter contained in the airflow W that has entered through the radiator grille 12 collides with the lower side bars 92 and the upper side bars 90 more readily. This enables the foreign matter to be further restricted from slipping through between the lower side bars 92 and the upper side bars 90. This enables foreign matter to be further restricted from entering the air intake ducts 22.

The airflow W that has entered through the radiator grille 12 flows toward the vehicle upper side, and foreign matter contained in the airflow W collides with the second direction-changing faces 58 of the upper side bars 90 and the second direction-changing faces 58 of the lower side bars 92, thereby enabling the foreign matter to be further restricted from slipping through between the lower side bars 92 and the upper side bars 90. Specifically, as illustrated in FIG. 7, the foreign matter (the solid lines in FIG. 7) collides with the lower side bars 92 or the upper side bars 90 without being able to follow the airflow W (the double-dotted dashed lines in FIG. 7) that attempts to flow toward the vehicle upper side and slip through between the lower side bars 92 and the upper side bars 90. The flow orientation of the foreign matter is thereby changed to the opposite direction (diagonally toward the vehicle lower side) to the flow of the airflow W (air). Since the foreign matter has more inertia, the foreign matter attempts to continue to flow in the changed flow orientation. The foreign matter that has changed flow orientation collides with following airflow W due to continuing to flow in the flow orientation diagonally downward. In cases in which the following airflow W contains foreign matter, the foreign matter that has changed flow orientation and the following foreign matter collide with each other, such that the orientation of the following foreign matter is also changed to diagonally toward the vehicle lower side, and the impetus of the flow toward the vehicle upper side is reduced. Namely, foreign matter is restricted from slipping through between the lower side bars 92 and the upper side bars 90. This enables foreign matter to be further restricted from entering the air intake ducts 22.

Since the cover ventilation sections 88 are disposed in positions overlapping with the respective air guidance ports 44 in the vehicle width direction (see FIG. 2), there is no need to change the flow along the vehicle width direction when the airflow W flows from the cover ventilation sections 88 toward the air guidance ports 44. This enables the airflow W to be efficiently guided into the air intake ducts 22.

Since the air guidance ports 44 are open toward the vehicle front, airflow W flowing toward the vehicle rear side can be efficiently guided into the air intake ducts 22.

The radiator support cover 94 is abutted by the hood inner panel 34 with the sealing member 78 interposed therebetween further toward the vehicle rear side than the positions where the air guidance ports 44 are formed (see FIG. 4), thereby enabling the airflow W to be efficiently guided through the air guidance ports 44 into the air intake ducts 22. This enables the airflow W to be effectively guided into the air intake ducts 22.

The vehicle lower side faces 70 of the respective air guidance ports 44 are disposed further toward the vehicle upper side than the vehicle upper side faces 91 of the respective upper side bars 90, thereby enabling foreign matter to be restricted from being guided through the air guidance ports 44 into the air intake ducts 22. This enables foreign matter to be still further restricted from entering the air intake ducts 22.

Gaps are formed between the upper side bars 90 and the lower side bars 92 as viewed from the mold removal direction, thereby enabling the upper side bars 90 and the lower side bars 92 to be integrally molded when molding the cover ventilation sections 88, and thereby the radiator support cover 94. This enables manufacturing costs to be reduced.

Fourth Exemplary Embodiment

Figure 8:
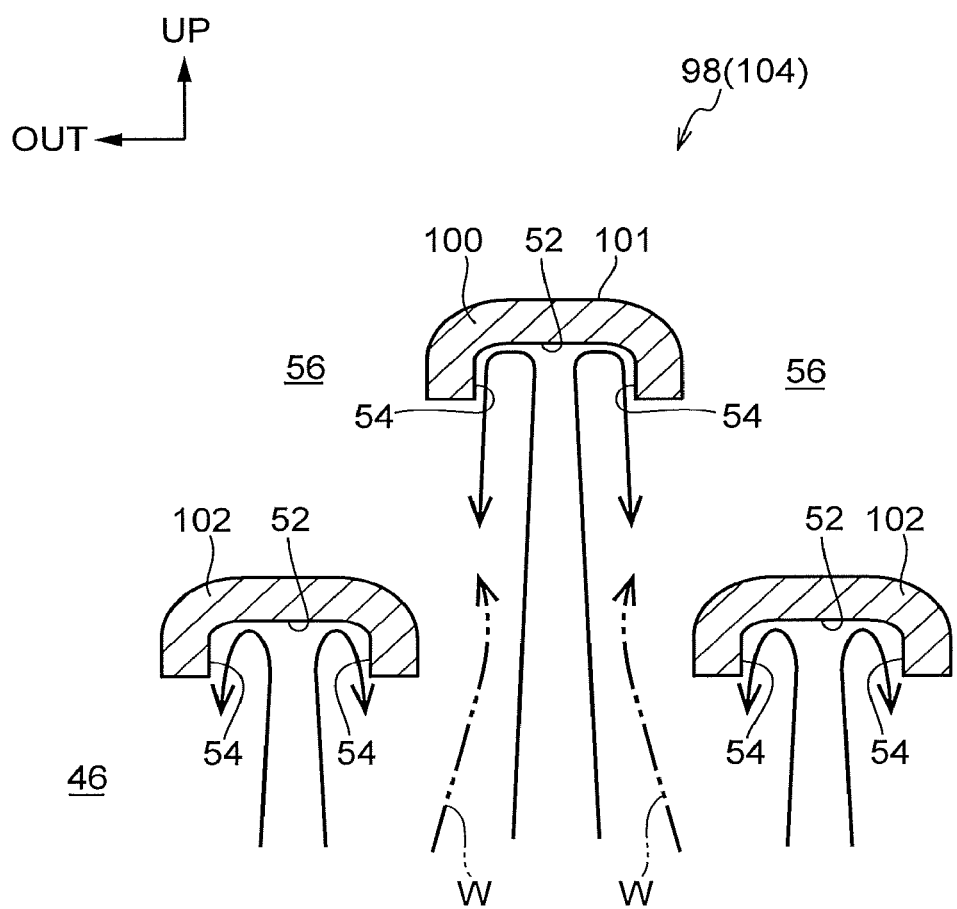
FIG. 8 is an outline cross-section schematically illustrating a flow of air in a cover ventilation section of a vehicle front section according to a fourth exemplary embodiment.

Explanation follows regarding a vehicle front section air intake structure according to a fourth exemplary embodiment of the present invention, with reference to FIG. 8. Note that similar configuration portions to the above-described first exemplary embodiment are appended with the same reference numerals, and explanation thereof is omitted.

As illustrated in FIG. 8, the vehicle front section air intake structure according to the fourth exemplary embodiment has basically the same configuration as that in the first exemplary embodiment, with a feature that the first direction-changing faces 52 are formed to both upper side bars 100 and lower side bars 102 of cover ventilation sections 98.

Namely, the cover ventilation sections 98 are provided at a radiator support cover 104. The cover ventilation sections 98 are disposed in positions overlapping with the respective air guidance ports 44 when viewing the vehicle face-on, and are each configured including the through-portion 46, the upper side bars 100, and the lower side bars 102.

Each upper side bar 100 is formed in a rectangular shape with its length direction along the vehicle front-rear direction in vehicle plan view. In other words, each upper side bar 100 is provided so as to span across the through-portion 46 in the vehicle front-rear direction. The first direction-changing face 52 is formed at a vehicle lower side portion of each upper side bar 100. The return portions 54 are thereby formed projecting out toward substantially the vehicle lower side at the respective lateral direction outsides of the upper side bar 100. Note that, although not illustrated in the drawings, plural of the upper side bars 100 are provided separated from each other along the width direction of the upper side bars 100. The slits 56 are thereby formed between the adjacent upper side bars 100.

The lower side bars 102 are provided at the vehicle lower side of the slits 56. Each lower side bar 102 is formed in a rectangular shape with its length direction running along the respective slit 56 in the vehicle front-rear direction in vehicle plan view. Similarly to the upper side bars 100, the first direction-changing face 52 is formed at a vehicle lower side portion of each lower side bar 102. The return portions 54 are thereby formed projecting out toward substantially the vehicle lower side at the respective lateral direction outsides of the lower side bars 102.

Operation and Advantageous Effects of Fourth Exemplary Embodiment

Explanation follows operation and advantageous effects of the present exemplary embodiment.

The radiator support cover 104 is similarly formed to the radiator support cover 20 of the first exemplary embodiment, with the exception that the first direction-changing faces 52 are formed at both the upper side bars 100 and the lower side bars 102, and so the above configuration obtains the below advantageous effects, similarly to those in the first exemplary embodiment. Namely, the upper side bars 100 and the lower side bars 102 are disposed in alternate positions to each other in the vehicle up-down direction, thereby restricting foreign matter from slipping through between the lower side bars 102 and the upper side bars 100. This enables foreign matter to be restricted from entering the air intake ducts 22.

Since the lower side bars 102 are disposed in positions overlapping with the respective slits 56 in vehicle plan view, foreign matter contained in the airflow W that has entered through the radiator grille 12 collides with the lower side bars 102 and the upper side bars 100 more readily. This enables the foreign matter to be further restricted from slipping through between the lower side bars 102 and the upper side bars 100. This enables foreign matter to be further restricted from entering the air intake ducts 22.

The airflow W that has entered through the radiator grille 12 flows toward the vehicle upper side, and foreign matter contained in the airflow W collides with the first direction-changing faces 52 of the upper side bars 100 and the first direction-changing faces 52 of the lower side bars 102, thereby enabling the foreign matter to be further restricted from slipping through between the lower side bars 102 and the upper side bars 100. Specifically, as illustrated in FIG. 8, the foreign matter (the solid lines in FIG. 8) collides with the lower side bars 102 or the upper side bars 100 without being able to follow the airflow W (the double-dotted dashed lines in FIG. 8) flowing toward the vehicle upper side and slipping through between the lower side bars 102 and the upper side bars 100. The flow orientation of the foreign matter is thereby changed toward the vehicle lower side along the return portions 54 of the first direction-changing faces 52 of the lower side bars 102 or the return portions 54 of the first direction-changing faces 52 of the upper side bars 100. Since the foreign matter has more inertia, the foreign matter attempts to continue to flow in a state in which its orientation has changed. The foreign matter that has changed flow orientation collides with following airflow W due to continuing to flow in the flow orientation substantially downward. In cases in which the following airflow W contains foreign matter, the foreign matter that has changed flow orientation and the following foreign matter collide with each other, such that the orientation of the following foreign matter is also changed toward the vehicle lower side, and the impetus of the flow toward the vehicle upper side is reduced. Namely, foreign matter is restricted from slipping through between the lower side bars 102 and the upper side bars 100. This enables foreign matter to be further restricted from entering the air intake ducts 22.

Since the cover ventilation sections 98 are disposed in positions overlapping with the respective air guidance ports 44 in the vehicle width direction (see FIG. 2), there is no need to change the flow along the vehicle width direction when the airflow W flows from the cover ventilation sections 98 toward the air guidance ports 44. This enables the airflow W to be efficiently guided into the air intake ducts 22.

Since the air guidance ports 44 are open toward the vehicle front, airflow W flowing toward the vehicle rear side can be efficiently guided into the air intake ducts 22.

The radiator support cover 104 is abutted by the hood inner panel 34 with the sealing member 78 interposed therebetween further toward the vehicle rear side than the positions where the air guidance ports 44 are formed (see FIG. 4), thereby enabling the airflow W to be efficiently guided through the air guidance ports 44 into the air intake ducts 22. This enables the airflow W to be effectively guided into the air intake ducts 22.

The vehicle lower side faces 70 of the respective air guidance ports 44 are disposed further toward the vehicle upper side than vehicle upper side faces 101 of the respective upper side bars 100, thereby enabling foreign matter to be restricted from being guided through the air guidance ports 44 into the air intake ducts 22. This enables foreign matter to be still further restricted from entering the air intake ducts 22.

Gaps are formed between the upper side bars 100 and the lower side bars 102 as viewed from the mold removal direction, thereby enabling the upper side bars 100 and the lower side bars 102 to be integrally molded when molding the cover ventilation sections 98, and thereby the radiator support cover 104. This enables manufacturing costs to be reduced.

Fifth Exemplary Embodiment

Figure 9:
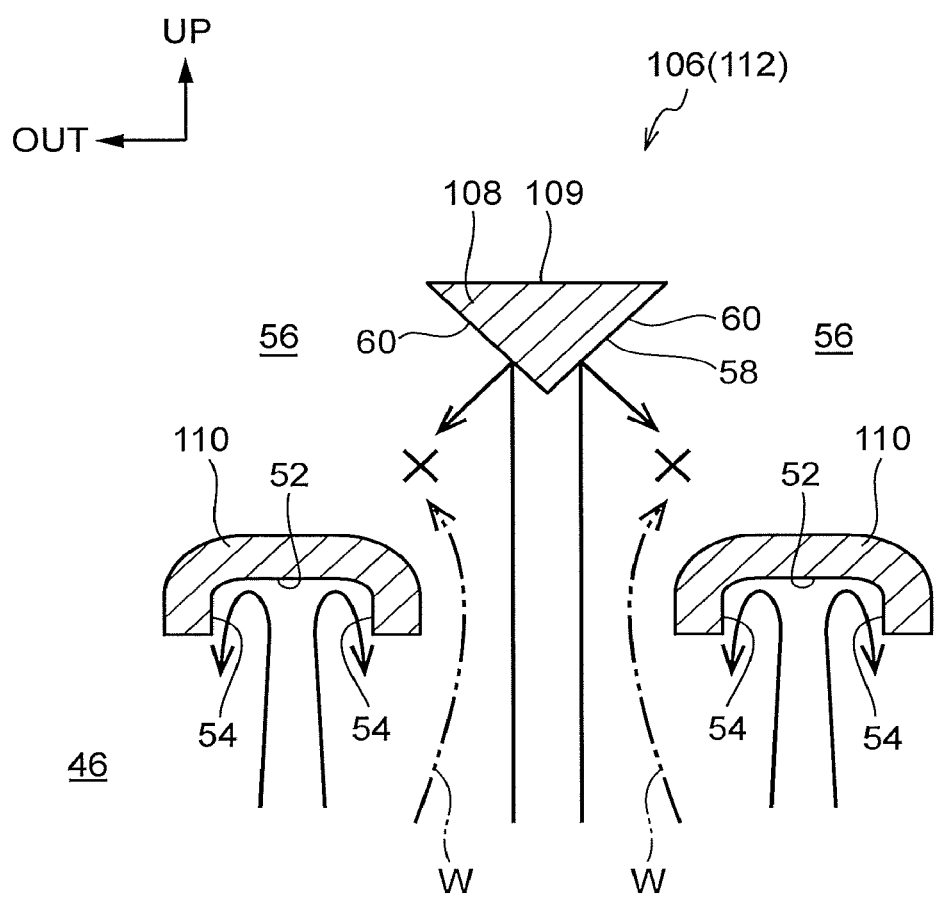
FIG. 9 is an outline cross-section schematically illustrating a flow of air in a cover ventilation section of a vehicle front section according to a fifth exemplary embodiment.

Explanation follows regarding a vehicle front section air intake structure according to a fifth exemplary embodiment of the present invention, with reference to FIG. 9. Note that similar configuration portions to the above-described first exemplary embodiment are appended with the same reference numerals, and explanation thereof is omitted.

As illustrated in FIG. 9, the vehicle front section air intake structure according to the fifth exemplary embodiment has basically the same configuration as that in the first exemplary embodiment, with a feature that the second direction-changing faces 58 are formed to upper side bars 108, and the first direction-changing faces 52 are formed to lower side bars 110, of cover ventilation sections 106.

Namely, the cover ventilation sections 106 are provided at a radiator support cover 112. The cover ventilation sections 106 are disposed in positions overlapping with the respective air guidance ports 44 when viewing the vehicle face-on, and are each configured including the through-portion 46, the upper side bars 108, and the lower side bars 110.

Each upper side bar 108 is formed in a rectangular shape with its length direction along the vehicle front-rear direction in vehicle plan view. In other words, each upper side bar 108 is provided so as to span across the through-portion 46 in the vehicle front-rear direction. The second direction-changing face 58 is formed at a vehicle lower side portion of each upper side bar 108. A cross-section profile along the vehicle width direction is accordingly formed in an inverted triangular shape with a vehicle upper side face 109 as a bottom face. Note that, although not illustrated in the drawings, plural of the upper side bars 108 are provided separated from each other along the width direction of the upper side bars 108. The slits 56 are thereby formed between the adjacent upper side bars 108.

The lower side bars 110 are provided at the vehicle lower side of the slits 56. Each lower side bar 110 is formed in a rectangular shape with its length direction running along the respective slit 56 in the vehicle front-rear direction in vehicle plan view. The first direction-changing face 52 is formed at a vehicle lower side portion of each lower side bar 110. The return portions 54 are thereby formed projecting out toward substantially the vehicle lower side at the respective lateral direction outsides of the lower side bars 110.

Operation and Advantageous Effects of Fifth Exemplary Embodiment

Explanation follows operation and advantageous effects of the present exemplary embodiment.

The radiator support cover 112 is similarly formed to the radiator support cover 20 of the first exemplary embodiment, with the exception that the second direction-changing faces 58 are formed to the upper side bars 108 and the first direction-changing faces 52 are formed to the lower side bars 110, and so the above configuration obtains the below advantageous effects, similarly to those in the first exemplary embodiment. Namely, the upper side bars 108 and the lower side bars 110 are disposed in alternate positions to each other in the vehicle up-down direction, thereby restricting foreign matter from slipping through between the lower side bars 110 and the upper side bars 108. This enables foreign matter to be restricted from entering the air intake ducts 22.

Since the lower side bars 110 are disposed in positions overlapping with the respective slits 56 in vehicle plan view, foreign matter contained in the airflow W that has entered through the radiator grille 12 collides with the lower side bars 110 and the upper side bars 108 more readily. This enables the foreign matter to be further restricted from slipping through between the lower side bars 110 and the upper side bars 108. This enables foreign matter to be further restricted from entering the air intake ducts 22.

The airflow W that has entered through the radiator grille 12 flows toward the vehicle upper side, and foreign matter contained in the airflow W collides with the second direction-changing faces 58 of the upper side bars 108 and the first direction-changing faces 52 of the lower side bars 110, thereby enabling the foreign matter to be further restricted from slipping through between the lower side bars 110 and the upper side bars 108. Specifically, as illustrated in FIG. 9, the foreign matter (the solid lines in FIG. 9) collides with the lower side bars 110 or the upper side bars 108 without being able to follow the airflow W (the double-dotted dashed lines in FIG. 9) that attempts to flow toward the vehicle upper side and slip through between the lower side bars 110 and the upper side bars 108. The foreign matter is thereby bounced back in the opposite direction (diagonally toward the vehicle lower side) to the flow direction of the airflow W (air), or the flow orientation of the foreign matter is changed to the vehicle lower side along the return portions 54 of the lower side bars 110. Since the foreign matter has more inertia, the foreign matter attempts to continue to flow in a state in which its orientation has changed. The foreign matter that has changed flow orientation collides with following airflow W due to continuing to flow in the state in which the flow orientation has changed. In cases in which the following airflow W contains foreign matter, the foreign matter that has changed flow orientation and the following foreign matter collide with each other, such that the orientation of the following foreign matter is also changed to diagonally toward the vehicle lower side or the vehicle lower side, and the impetus of the flow toward the vehicle upper side is reduced. Namely, foreign matter is restricted from slipping through between the lower side bars 110 and the upper side bars 108. This enables foreign matter to be further restricted from entering the air intake ducts 22.

Since the cover ventilation sections 106 are disposed in positions overlapping with the respective air guidance ports 44 in the vehicle width direction (see FIG. 2), there is no need to change the flow along the vehicle width direction when the airflow W flows from the cover ventilation sections 106 toward the air guidance ports 44. This enables the airflow W to be efficiently guided into the air intake ducts 22.

Since the air guidance ports 44 are open toward the vehicle front, airflow W flowing toward the vehicle rear side can be efficiently guided into the air intake ducts 22.

The radiator support cover 112 is abutted by the hood inner panel 34 with the sealing member 78 interposed therebetween further toward the vehicle rear side than the positions where the air guidance ports 44 are formed (see FIG. 4), thereby enabling the airflow W to be efficiently guided through the air guidance ports 44 into the air intake ducts 22. This enables the airflow W to be effectively guided into the air intake ducts 22.

The vehicle lower side faces 70 of the respective air guidance ports 44 are disposed further toward the vehicle upper side than the vehicle upper side faces 109 of the respective upper side bars 108, thereby enabling foreign matter to be restricted from being guided through the air guidance ports 44 into the air intake ducts 22. This enables foreign matter to be still further restricted from entering the air intake ducts 22.

Gaps are formed between the upper side bars 108 and the lower side bars 110 as viewed from the mold removal direction, thereby enabling the upper side bars 108 and the lower side bars 110 to be integrally molded when molding the cover ventilation sections 106, and thereby the radiator support cover 112. This enables manufacturing costs to be restricted.

Note that in the first to fifth exemplary embodiments described above, each cover ventilation section 42, 80, 88, 98, 106 is configured of the upper side bars 48, 82, 90, 100, 108 and the lower side bars 50, 84, 92, 102, 110 provided in two rows in the vehicle up-down direction. However, configuration is not limited thereto, and configuration may be such that intermediate bars with the same shape as at least one of either the upper side bars 48, 82, 90, 100, 108 or the lower side bars 50, 84, 92, 102, 110 are provided between the upper side bars 48, 82, 90, 100, 108 and the lower side bars 50, 84, 92, 102, 110, such that three or more rows of bars are provided in the vehicle up-down direction. There is also no limitation to a configuration in which the cover ventilation sections 42, 80, 88, 98, 106 are integrally formed to the radiator support cover 20, 86, 94, 104, 112, and configuration may be such that cover ventilation sections configured of bars formed as separate bodies are attached to a radiator support cover.

A configuration in which the upper side bars 48, 82, 90, 100, 108 and the lower side bars 50, 84, 92, 102, 110 extend along the vehicle width direction may be applied as a reference example that is not applied with the present invention.

Exemplary embodiments of the present invention have been explained above; however, the present invention is not limited to the above description, and obviously various other modifications may be implemented with a range not departing from the spirit of the present invention.

What is claimed is:

1. A vehicle front section air intake structure of a vehicle equipped with a substantially frame shaped radiator support extending along a vehicle width direction, the vehicle front section air intake structure comprising:
   a radiator grille that is configured to be provided at a vehicle front side of the radiator support);
   a hood inner panel that is configured to be disposed at a vehicle upper side of the radiator support and that is disposed at a vehicle upper side of the radiator grille;
   a radiator support cover that has a front end portion fixed to an upper portion of the radiator grille, that is disposed separated from the hood inner panel between an upper end portion of the radiator support and the hood inner panel, and that is formed in a substantially plate shape extending in the vehicle width direction along the radiator support; and an air intake duct that is provided at a vehicle rear side of the radiator support cover and that guides air from an air guidance port of the radiator support cover toward an engine, wherein the radiator support cover includes,
- a cover ventilation section that causes an air current from the radiator grille to flow between the radiator support cover and the hood inner panel, and
- the air guidance port that is formed at a vehicle rear of the cover ventilation section and that guides the air current toward the vehicle rear side, and wherein the cover ventilation section of the radiator support cover is provided with,
- a plurality of upper side bars that extend along a vehicle front-rear direction and are disposed alternating with slits in the vehicle width direction, and
- a plurality of lower side bars that are disposed at a vehicle lower side of the slits and that extend along the vehicle front-rear direction.

2. The vehicle front section air intake structure of claim 1, wherein the lower side bars are disposed in positions overlapping with the slits in a vehicle plan view.

3. The vehicle front section air intake structure of claim 1, wherein a first direction-changing face formed so as to be recessed inward toward the vehicle upper side is formed at a vehicle lower side portion of at least one of either the upper side bars or the lower side bars.

4. The vehicle front section air intake structure of claim 1, wherein a second direction-changing face is formed at a vehicle lower side portion of at least one of either the upper side bars or the lower side bars, the second direction-changing face including sloped faces that slope toward the vehicle upper side from an apex formed at a substantially vehicle width direction center portion of the vehicle lower side portion of the at least one of either the upper side bars or the lower side bars, and the sloped faces being disposed progressing along the vehicle width direction and away from each other.

5. The vehicle front section air intake structure of claim 1, wherein at least a portion of the cover ventilation section is disposed in a position overlapping with the air guidance port when viewing the vehicle face-on.

6. The vehicle front section air intake structure of claim 5, wherein the air guidance port is open toward the vehicle front.

7. The vehicle front section air intake structure of claim 1, wherein the radiator support cover is abutted by the hood inner panel with a sealing member interposed therebetween along the vehicle width direction at further toward the vehicle rear side than a position at which the air guidance port is formed.

8. The vehicle front section air intake structure of claim 1, wherein a vehicle lower side face of the air guidance port is disposed further toward the vehicle upper side than vehicle upper side faces of the upper side bars.

* * * * *